(12) United States Patent
Chao et al.

(10) Patent No.: US 11,283,562 B1
(45) Date of Patent: Mar. 22, 2022

(54) WIFI CHANNELIZATION FOR 6 GIGAHERTZ BAND

(71) Applicant: Marvell Asia Pte, Ltd., Singapore (SG)

(72) Inventors: Yi-Ling Chao, Sunnyvale, CA (US); Hui-Ling Lou, Sunnyvale, CA (US)

(73) Assignee: Marvell Asia Pte Ltd, Singapore (SG)

( * ) Notice: Subject to any disclaimer, the term of this patent is extended or adjusted under 35 U.S.C. 154(b) by 93 days.

(21) Appl. No.: 16/797,937

(22) Filed: Feb. 21, 2020

Related U.S. Application Data (60) Provisional application No. 62/808,743, filed on Feb. 21, 2019.

(51) Int. Cl.
| | |
|---|---|
| *H04L 5/00* | (2006.01) |
| *H04W 88/06* | (2009.01) |
| *H04W 16/10* | (2009.01) |
| *H04W 72/04* | (2009.01) |
| *H04W 84/12* | (2009.01) |
| *H04L 5/06* | (2006.01) |

(52) U.S. Cl.
CPC .............. *H04L 5/0041* (2013.01); *H04L 5/06* (2013.01); *H04W 16/10* (2013.01); *H04W 72/0453* (2013.01); *H04W 84/12* (2013.01); *H04W 88/06* (2013.01)

(58) Field of Classification Search
CPC . H04W 16/14; H04W 16/10; H04W 72/0453; H04W 84/12; H04W 88/06; H04L 5/0041; H04L 5/06
See application file for complete search history.

(56) References Cited

U.S. PATENT DOCUMENTS

| | | | |
|---|---|---|---|
| 2014/0133411 A1* | 5/2014 | Park | H04L 5/0053 370/329 |
| 2015/0103713 A1* | 4/2015 | Lee | H04W 52/0235 370/311 |

OTHER PUBLICATIONS

Zhang et al., "EHT Technology Candidate Discussions," doc: IEEE 802.11-18/1161r0, *The Institute of Electrical and Electronics Engineers, Inc.*, pp. 1- 10 Jul. 8, 2018.

(Continued)

*Primary Examiner* — Shukri Taha (57) ABSTRACT

A first communication device in a wireless local area network (WLAN) selects an aggregate communication channel from a first set of one or more allowed non-overlapping aggregate communication channels that is wholly within a first radio frequency (RF) sub-band that is adjacent in frequency to a second RF sub-band. The second RF sub-band includes a second set of one or more allowed non-overlapping aggregate communication channels that is wholly within the second RF sub-band and that is separated in frequency from the first set of allowed aggregate communication channels by a gap in frequency. The gap in frequency is smaller than a cumulative bandwidth of two component communication channels in the first RF sub-band. The method also includes: using, at the first communication device, the selected aggregate communication channel to transmit a packet to one or more second communication devices in the WLAN.

20 Claims, 5 Drawing Sheets

(56) References Cited

OTHER PUBLICATIONS

IEEE P802.11ax™/D4.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 746 pages (Feb. 2019).

IEEE P802.11ax™/D5.0, "Draft Standard for Information technology—Telecommunications and information exchange between systems Local and metropolitan area networks—Specific Requirements, Part 11: Wireless LAN Medium Access Control (MAC) and Physical Layer (PHY) Specifications, Amendment 1: Enhancements for High Efficiency WLAN," IEEE Computer Society, 772 pages (Oct. 2019).

\* cited by examiner

WIFI CHANNELIZATION FOR 6 GIGAHERTZ BAND

CROSS REFERENCES TO RELATED APPLICATIONS

The present application claims the benefit of U.S. Provisional Patent Application No. 62/808,743, entitled "6 GHz Band Channelization," filed on Feb. 21, 2019, which is hereby incorporated by reference herein in its entirety.

FIELD OF TECHNOLOGY

The present disclosure relates generally to wireless communication systems, and more particularly to selecting communication channels to use in a wireless communication network.

BACKGROUND

Wireless local area networks (WLANs) have evolved rapidly over the past two decades, and development of WLAN standards such as the Institute for Electrical and Electronics Engineers (IEEE) 802.11 Standard family has improved single-user peak data rates. For example, the IEEE 802.11b Standard specifies a single-user peak rate of 11 megabits per second (Mbps), the IEEE 802.11a and 802.11g Standards specify a single-user peak rate of 54 Mbps, the IEEE 802.11n Standard specifies a single-user peak rate of 600 Mbps, and the IEEE 802.11ac Standard specifies a single-user peak rate in the gigabits per second (Gbps) range. The IEEE 802.11ax Standard now in the final stage of development significantly improves throughput over the IEEE 802.11ac Standard.

In 2018, the Federal Communication Commission (FCC) issued a Notice of Proposed Rulemaking that proposed rules for unlicensed use of spectrum in a 6 Gigahertz (GHz) radio frequency (RF) band (5.925-7.125 GHz). Because the 6 GHz RF band includes incumbent licensed users (typically fixed, point-to-point communication links), the proposed rules would define different device categories for unlicensed users in the 6 GHz RF band, and would require use of an automated frequency control (AFC) system for certain sub-bands in the 6 GHz RF band. The proposed AFC system would include a database of licensed users in the 6 GHz RF band, including geographic and bandwidth locations of licensed users. An unlicensed user seeking to use spectrum in certain sub-bands in the 6 GHz RF band would be required to consult the AFC system and avoid using spectrum already in use by local licensed users.

Figure 1:
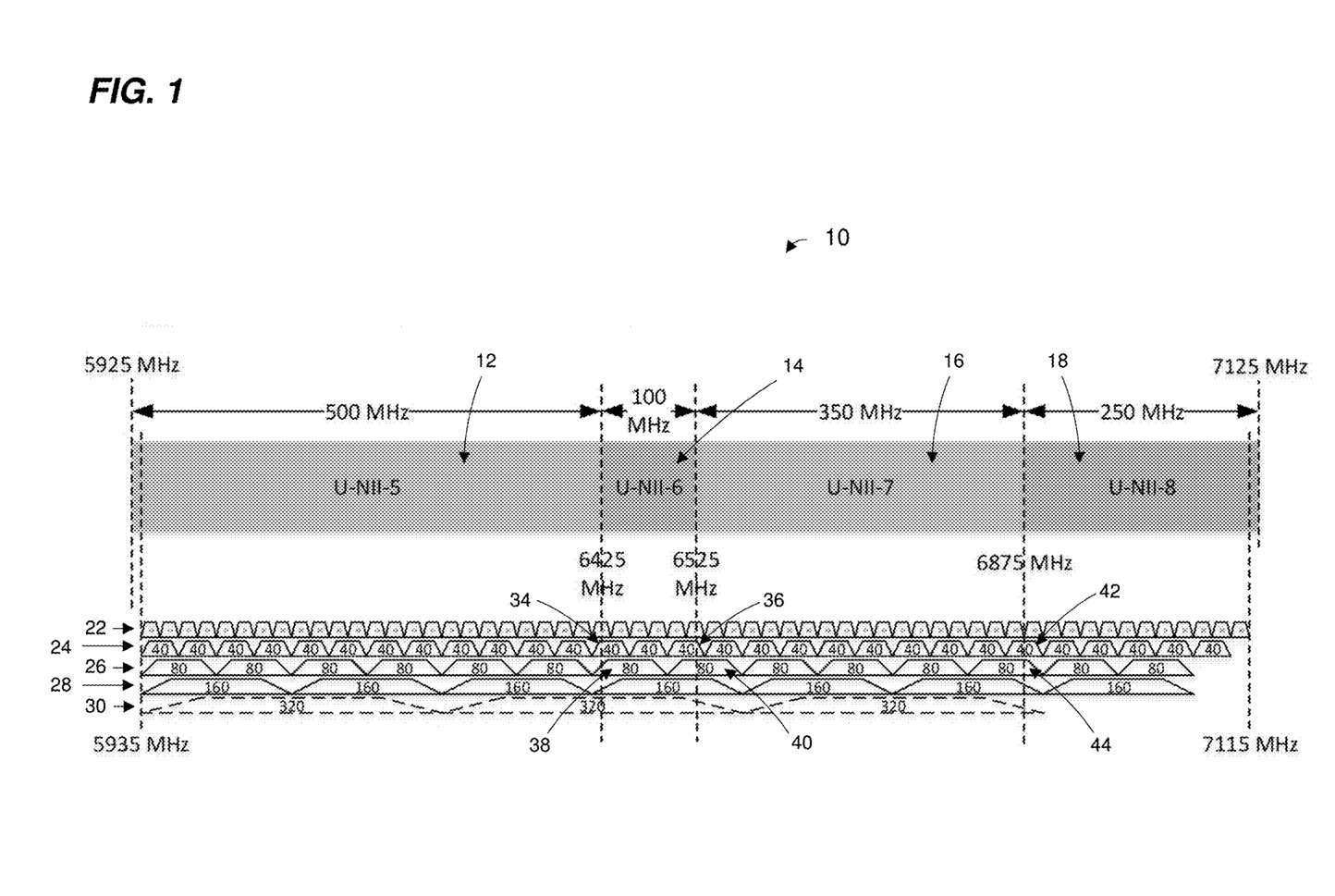
FIG. 1 is a diagram of an example prior art wireless local area network (WLAN) channelization scheme in a 6 GHz radio frequency (RF) band.

The IEEE has proposed using the 6 GHz RF band for WLANs. FIG. 1 is a diagram of a proposed WLAN channelization scheme 10 for the 6 GHz RF band. The FCC proposed partitioning the 6 GHz RF band into a plurality of sub-bands, including an unlicensed national information infrastructure (U-NII) sub-band 12 (U-NII-5) (5925-6425 MHz), a U-NII sub-band 14 (U-NII-6) (6425-6525 MHz), a U-NII sub-band 16 (U-NII-7) (6525-6875 MHz), and a U-NII sub-band 18 (U-NII-7) (6875-7125 MHz). According to the FCC's proposal, U-NII-5 and U-NII-7 will require use of the AFC system, whereas U-NII-6 and U-NII-8 will not require use of the AFC system. Additionally, a WLAN access point (AP) operating in U-NII-5 and U-NII-7 may follow standard power limits regarding AP transmit power, whereas U-NII-6 and U-NII-8 is restricted to indoor use with reduced AP transmit power limits.

The proposed WLAN channelization scheme 10 includes a plurality of 20 MHz component communication channels 22. The proposed WLAN channelization scheme 10 also proposes use of wider aggregate communication channels formed by aggregating multiple 20 MHz component communication channels 22. For example, the proposed WLAN channelization scheme 10 includes a plurality of 40 MHz aggregate communication channels 24. Similarly, 80 MHz aggregate communication channels can be formed by aggregating multiple 40 MHz communication channels 24; thus, the proposed WLAN channelization scheme 10 includes a plurality of 80 MHz aggregate communication channels 26. Similarly, 160 MHz aggregate communication channels can be formed by aggregating multiple 80 MHz communication channels 26; thus, the proposed WLAN channelization scheme 10 includes a plurality of 160 MHz aggregate communication channels 28. Similarly, 320 MHz aggregate communication channels can be formed by aggregating multiple 160 MHz communication channels 28; thus, the proposed WLAN channelization scheme 10 includes a plurality of 320 MHz aggregate communication channels 30.

Details of the AFC system (e.g., who will operate and maintain the databases, how the databases will accessed, etc.) are not yet finalized. As a result, WLAN device manufacturers initially will likely seek to produce 6 GHz capable WLAN devices that operate only in the U-NII-6 and/or U-NII-8 sub-bands, which do not require use of the AFC system. Additionally, in order to provide a range of 6 GHz capable WLAN devices at different prices, WLAN device manufacturers will likely produce lower cost WLAN devices that are not capable of using the AFC system, and thus will be permitted to operate in only the U-NII-6 and/or U-NII-8 sub-bands.

SUMMARY

In an embodiment, a method for communicating in a wireless local area network (WLAN) includes: selecting, at a first communication device, an aggregate communication channel from a first set of one or more allowed non-overlapping aggregate communication channels that is wholly within a first radio frequency (RF) sub-band that is adjacent in frequency to a second RF sub-band. The second RF sub-band includes a second set of one or more allowed non-overlapping aggregate communication channels that is wholly within the second RF sub-band and that is separated in frequency from the first set of allowed aggregate communication channels by a gap in frequency. The gap in frequency is smaller than a cumulative bandwidth of two component communication channels in the first RF sub-band. The method also includes: using, at the first communication device, the selected aggregate communication channel to transmit a packet to one or more second communication devices in the WLAN.

In another embodiment, a wireless communication device for communicating in a WLAN comprises a wireless network interface device having one or more integrated circuit (IC) devices. The one or more IC devices are configured to: select an aggregate communication channel from a first set of one or more allowed non-overlapping aggregate communication channels that is wholly within a first RF sub-band that is adjacent in frequency to a second RF sub-band. The second RF sub-band includes a second set of one or more allowed non-overlapping aggregate communication channels that is wholly within the second RF sub-band and that is separated in frequency from the first set of allowed aggregate communication channels by a gap in frequency.

The gap in frequency is smaller than a cumulative bandwidth of two component communication channels in the first RF sub-band. The one or more IC devices are further configured to: use the selected aggregate communication channel to transmit a packet to one or more second communication devices in the WLAN.

DETAILED DESCRIPTION

The wireless local area network (WLAN) channelization scheme 10 has several drawbacks. In particular, multiple aggregate channels (e.g., 40 MHz channels, 80 MHz channels, etc.) in U-NII-6 and U-NII-8 cross into U-NII-5 and U-NII-7. For example, a 40 MHz channel 34 is partially within U-NII-5, and a 40 MHz channel 36 is partially within U-NII-7. Similarly, an 80 MHz channel 38 is partially within U-NII-5, and an 80 MHz channel 40 is partially within U-NII-7. Similarly, a 40 MHz channel 42 is partially within U-NII-7, and an 80 MHz channel 44 is partially within U-NII-7. Because these aggregate channels are partially within U-NII-5 or U-NII-7, it is unclear whether these aggregate channels can be used without employing the AFC system. Moreover, in the event the AFC system is required with any aggregate channels that are partially within U-NII-5 or U-NII-7, this will limit the number of aggregate channels that can be used without having to use the AFC system. For example, U-NII-6 includes only one 40 MHz aggregate channel that is wholly within U-NII-6, and U-NII-6 includes no 80 MHz aggregate channels that are wholly within U-NII-6. Thus, a WLAN device that is not capable of the using the AFC system may be limited to using only one 40 MHz channel in U-NII-6, and may not be able to use any 80 MHz channels in U-NII-6.

In embodiments described below, wireless communication devices in a wireless network, such as a WLAN, operate according to a channelization scheme in which numbers of aggregate communication channels in particular RF sub-bands are maximized. As an illustrative example, in a 100 MHz-wide RF sub-band, an example channelization scheme provides two non-overlapping 40 MHz aggregate channels wholly within the RF sub-band, according to an illustrative embodiment. On the other hand, the channelization scheme 10 of FIG. 1 provides only a single 40 MHz aggregate channel wholly within the 100 MHz-wide U-NII-6 sub-band. As another illustrative example, in a 250 MHz-wide RF sub-band, an example channelization scheme provides six non-overlapping 40 MHz aggregate channels and three non-overlapping 80 MHz aggregate channels wholly within the RF sub-band, according to an illustrative embodiment. On the other hand, the channelization scheme 10 of FIG. 1 provides only five 40 MHz aggregate channels and two 80 MHz aggregate channels wholly within the 250 MHz-wide U-NII-8 sub-band. As used herein, the term "non-overlapping channels" refers to communication channels in which no communication channel substantially overlaps in frequency with any another communication channel (i.e., no more than 5% of a communication channel overlaps with any other communication channel). As a specific example, communication channels in which no communication channel overlaps at all in frequency with any another communication channel are "non-overlapping channels". As used herein, a set of communication channels that are "wholly within" an RF sub-band refers to a set of communications channels in which no portion of any communication channel is outside (in frequency) of the RF sub-band and/or in which no communication channel crosses (in frequency) a boundary of the RF sub-band and extends into another adjacent RF sub-band.

Figure 2:
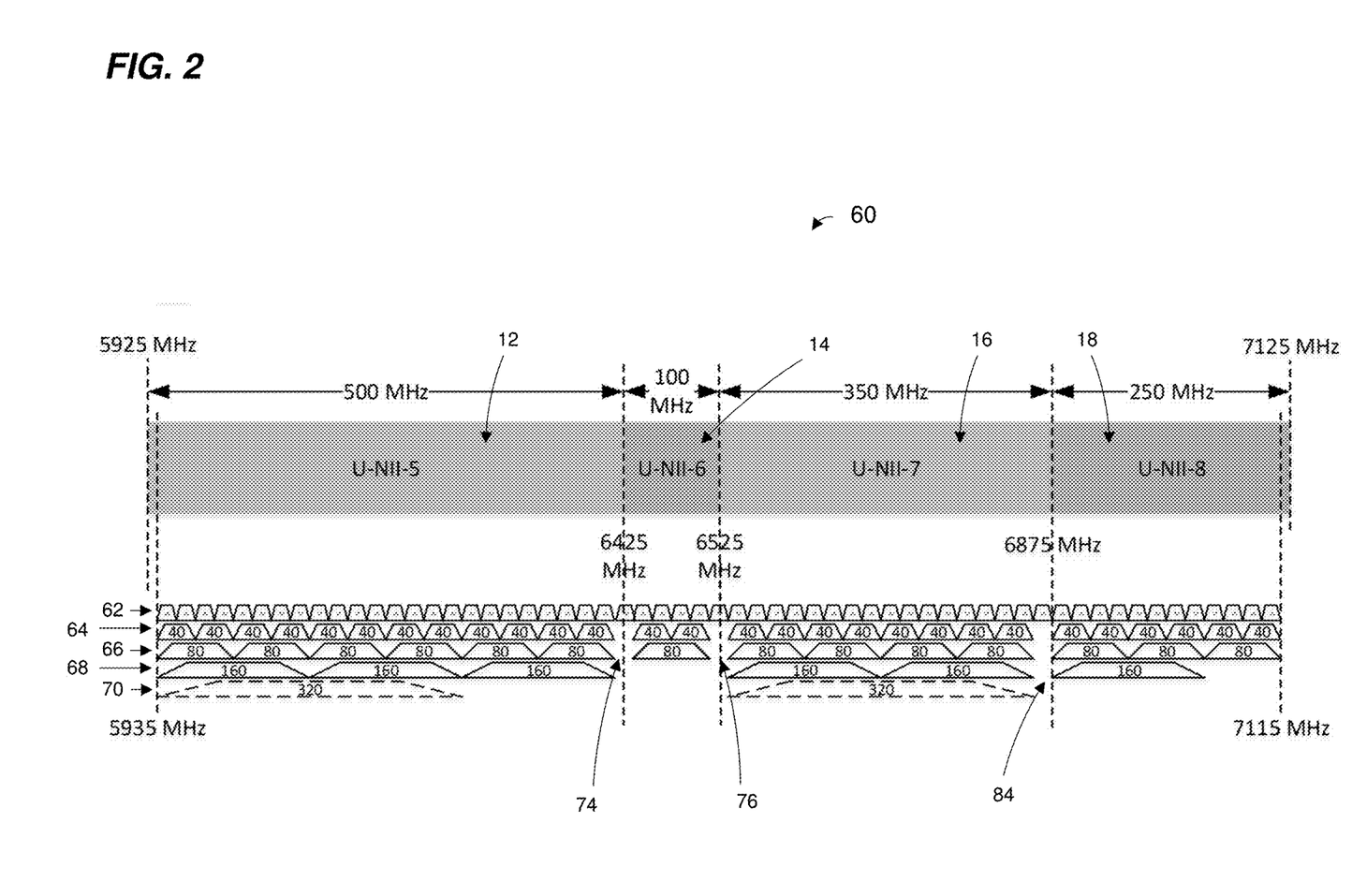
FIG. 2 is a diagram of an example WLAN channelization scheme in a 6 GHz RF band that maximizes a number of aggregate communication channels wholly within each of multiple RF sub-bands, according to an embodiment.

FIG. 2 is a diagram of an example WLAN channelization scheme 60 according to which WLAN devices operate, in an embodiment. The example WLAN channelization scheme 60 is for the 6 GHz RF band, which is partitioned into the U-NII-5, U-NII-6, U-NII-7, and U-NII-8 sub-bands as discussed above.

The WLAN channelization scheme 60 includes a plurality of 20 MHz component communication channels 62, a plurality of 40 MHz aggregate communication channels 64, a plurality of 80 MHz aggregate communication channels 66, a plurality of 160 MHz aggregate communication channels 68, and a plurality of 320 MHz aggregate communication channels 70, according to an embodiment.

U-NII-6 includes a maximum number (e.g., two) of non-overlapping 40 MHz aggregate channels wholly within U-NII-6, and a maximum number (e.g., one) of non-overlapping 80 MHz aggregate channels wholly within U-NII-6. On the other hand, U-NII-6 includes four non-overlapping 20 MHz component channels wholly within U-NII-6, which is not a maximum number of non-overlapping 20 MHz component channels that could fit wholly within U-NII-6 sub-band.

Similarly, U-NII-8 includes a maximum number (e.g., six) of non-overlapping 40 MHz aggregate channels wholly within U-NII-8, and a maximum number (e.g., three) of non-overlapping 80 MHz aggregate channels wholly within U-NII-8. Additionally, U-NII-8 includes a maximum number (e.g., twelve) of non-overlapping 20 MHz component channels wholly within U-NII-8.

In the embodiment illustrated in FIG. 2, the plurality of 40 MHz aggregate channels 64 is not continuous, as contrasted with the plurality of 40 MHz aggregate channels 24 in the channelization scheme 10 of FIG. 1. For example, 40 MHz aggregate channels in U-NII-6 are separated by a gap 74 in frequency from 40 MHz aggregate channels in U-NII-5. Similarly, 40 MHz aggregate channels in U-NII-6 are separated by a gap 76 in frequency from 40 MHz aggregate channels in U-NII-7. Similarly, 40 MHz aggregate channels in U-NII-8 are separated by a gap 84 in frequency from 40 MHz aggregate channels in U-NII-7. Gap 74 crosses a boundary between U-NII-5 and U-NII-6. Gap 76 crosses a boundary between U-NII-6 and U-NII-6. Gap 84 crosses a boundary between U-NII-7 and U-NII-8.

In the embodiment illustrated in FIG. 2, the plurality of 80 MHz aggregate channels 66 is also not continuous, as contrasted with the plurality of 80 MHz aggregate channels 26 in the channelization scheme 10 of FIG. 1. For example, an 80 MHz aggregate channel in U-NII-6 is separated by the gap 74 in frequency from 80 MHz aggregate channels in U-NII-5. Similarly, the 80 MHz aggregate channel in U-NII-6 is separated by the gap 76 in frequency from 80 MHz aggregate channels in U-NII-7. Similarly, 80 MHz aggregate channels in U-NII-8 are separated by the gap 84 in frequency from 80 MHz aggregate channels in U-NII-7.

In the embodiment illustrated in FIG. 2, none of the 40 MHz aggregate channels crosses a boundary between the U-NII-5, U-NII-6, U-NII-7, and U-NII-8 sub-bands. Similarly, none of the 80 MHz aggregate channels crosses a boundary between the U-NII-5, U-NII-6, U-NII-7, and U-NII-8 sub-bands. Similarly, none of the 160 MHz and 320 MHz aggregate channels crosses a boundary between the U-NII-5, U-NII-6, U-NII-7, and U-NII-8 sub-bands.

In the embodiment illustrated in FIG. 2, U-NII-5 includes a maximum number (e.g., twelve) of non-overlapping 40 MHz aggregate channels wholly within U-NII-5, and a maximum number (e.g., six) of non-overlapping 80 MHz aggregate channels wholly within U-NII-5. On the other hand, U-NII-5 includes twenty four 20 MHz component channels, which is not a maximum number (e.g., twenty five) of non-overlapping 20 MHz component channels that could wholly fit within U-NII-5.

Similarly, U-NII-7 includes a maximum number (e.g., eight) of non-overlapping 40 MHz aggregate channels wholly within U-NII-7, a maximum number (e.g., four) of non-overlapping 80 MHz aggregate channels wholly within U-NII-7, a maximum number (e.g., two) of non-overlapping 160 MHz aggregate channels wholly within U-NII-7, and a maximum number (e.g., one) of non-overlapping 320 MHz aggregate channels wholly within U-NII-7. Additionally, U-NII-7 includes a maximum number (e.g., 17) of non-overlapping 20 MHz component channels wholly within U-NII-7.

Figure 3:
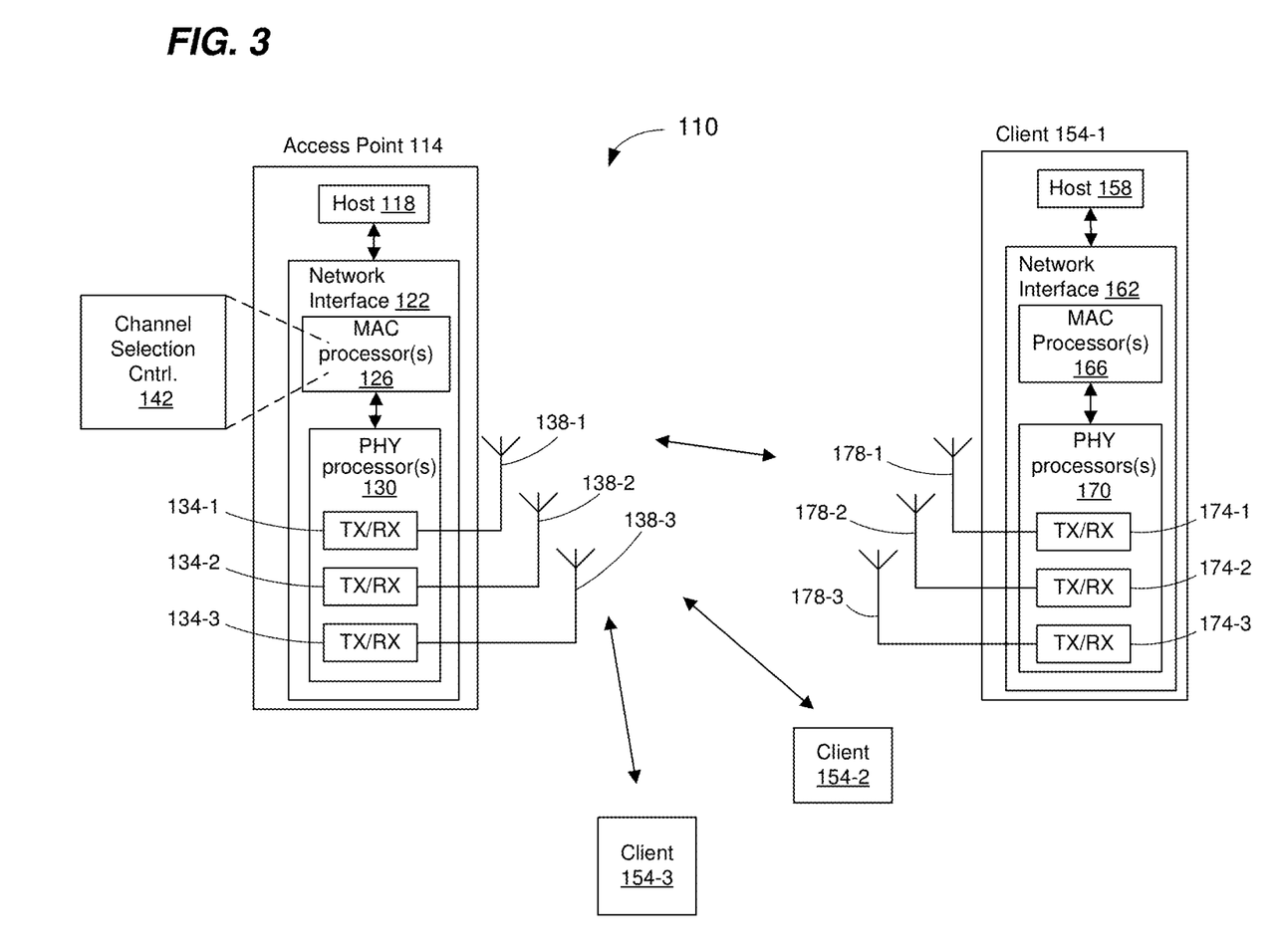
FIG. 3 is a block diagram of an example WLAN in which communication devices select communication channels to use according to the example channelization scheme of FIG. 2, according to an embodiment.

FIG. 3 is a block diagram of an example WLAN 110 that is configured to utilize the channelization scheme 60 of FIG. 2, or another suitable channelization scheme, according to an embodiment. The WLAN 110 includes an AP 114 that comprises a host processor 118 coupled to a wireless network interface device 122. The wireless network interface device 122 includes one or more medium access control (MAC) processors 126 (sometimes referred to herein as "the MAC processor 126" for brevity) and one or more PHY processors 130 (sometimes referred to herein as "the PHY processor 130" for brevity). The PHY processor 130 includes a plurality of transceivers 134, and the transceivers 134 are coupled to a plurality of antennas 138. Although three transceivers 134 and three antennas 138 are illustrated in FIG. 3, the AP 114 includes other suitable numbers (e.g., 1, 2, 4, 5, etc.) of transceivers 134 and antennas 138 in other embodiments. In some embodiments, the AP 114 includes a higher number of antennas 138 than transceivers 134, and antenna switching techniques are utilized.

In an embodiment, the wireless network interface device 122 is configured for operation within a single RF band at a given time. In another embodiment, the wireless network interface device 122 is configured for operation within two or more RF bands at the same time or at different times. For example, in an embodiment, the wireless network interface device 122 includes multiple PHY processors 130, where respective PHY processors 130 correspond to respective RF bands. In another embodiment, the wireless network interface device 122 includes a single PHY processor 130, where each transceiver 134 includes respective RF radios corresponding to respective RF bands.

The wireless network interface device 122 is implemented using one or more integrated circuits (ICs) configured to operate as discussed below. For example, the MAC processor 126 may be implemented, at least partially, on a first IC, and the PHY processor 130 may be implemented, at least partially, on a second IC. The first IC and the second IC may be packaged together in a single IC package thereby forming a modular device, or the first IC and the second IC may be coupled together on a single printed board, for example, in various embodiments. As another example, at least a portion of the MAC processor 126 and at least a portion of the PHY processor 130 may be implemented on a single IC. For instance, the wireless network interface device 122 may be implemented using a system on a chip (SoC), where the SoC includes at least a portion of the MAC processor 126 and at least a portion of the PHY processor 130.

In an embodiment, the host processor 118 includes a processor configured to execute machine readable instructions stored in a memory device (not shown) such as a random access memory (RAM), a read-only memory (ROM), a flash memory, etc. In an embodiment, the host processor 118 may be implemented, at least partially, on a first IC, and the network device 122 may be implemented, at least partially, on a second IC. As another example, the host processor 118 and at least a portion of the wireless network interface device 122 may be implemented on a single IC.

In various embodiments, the MAC processor 126 and/or the PHY processor 130 of the AP 114 are configured to generate data units, and process received data units, that conform to a WLAN communication protocol such as a communication protocol conforming to the IEEE 802.11 Standard or another suitable wireless communication protocol. For example, the MAC processor 126 may be configured to implement MAC layer functions, including MAC layer functions of the WLAN communication protocol, and the PHY processor 130 may be configured to implement PHY functions, including PHY functions of the WLAN communication protocol. For instance, the MAC processor 126 may be configured to generate MAC layer data units such as MAC service data units (MSDUs), MAC protocol data units (MPDUs), etc., and provide the MAC layer data units to the PHY processor 130. The PHY processor 130 may be configured to receive MAC layer data units from the MAC processor 126 and encapsulate the MAC layer data units to generate PHY data units such as PHY protocol data units (PPDUs) for transmission via the antennas 138. Similarly, the PHY processor 130 may be configured to receive PHY data units that were received via the antennas 138, and extract MAC layer data units encapsulated within the PHY data units. The PHY processor 130 may provide the extracted MAC layer data units to the MAC processor 126, which processes the MAC layer data units.

PHY data units are sometimes referred to herein as "packets", and MAC layer data units are sometimes referred to herein as "frames".

In connection with generating one or more RF signals for transmission, the PHY processor 130 is configured to process (which may include modulation, filtering, etc.) data corresponding to a PPDU to generate one or more digital baseband signals, and convert the digital baseband signal(s) to one or more analog baseband signals, according to an embodiment. Additionally, the PHY processor 130 is configured to upconvert the one or more analog baseband signals to one or more RF signals for transmission via the one or more antennas 138.

In connection with receiving one or more RF signals, the PHY processor 130 is configured to downconvert the one or more RF signals to one or more analog baseband signals, and to convert the one or more analog baseband signals to one or more digital baseband signals. The PHY processor 130 is further configured to process (which may include demodulation, filtering, etc.) the one or more digital baseband signals to generate a PPDU.

The PHY processor 130 includes amplifiers (e.g., a low noise amplifier (LNA), a power amplifier, etc.), an RF downconverter, an RF upconverter, a plurality of filters, one or more analog-to-digital converters (ADCs), one or more digital-to-analog converters (DACs), one or more discrete Fourier transform (DFT) calculators (e.g., a fast Fourier transform (FFT) calculator), one or more inverse discrete Fourier transform (IDFT) calculators (e.g., an inverse fast Fourier transform (IFFT) calculator), one or more modulators, one or more demodulators, etc.

The PHY processor 130 is configured to generate one or more RF signals that are provided to the one or more antennas 138. The PHY processor 130 is also configured to receive one or more RF signals from the one or more antennas 138.

The MAC processor 126 is configured to control the PHY processor 130 to generate one or more RF signals, for example, by providing one or more MAC layer data units (e.g., MPDUs) to the PHY processor 130, and optionally providing one or more control signals to the PHY processor 130, according to some embodiments. In an embodiment, the MAC processor 126 includes a processor configured to execute machine readable instructions stored in a memory device (not shown) such as a RAM, a read ROM, a flash memory, etc. In another embodiment, the MAC processor 126 includes a hardware state machine.

The MAC processor 126 includes, or implements, a channel selection controller 142. The channel selection controller 142 selects communication channels for communicating in the WLAN 110 according to a channelization scheme such as the channelization scheme 60 of FIG. 2, or another suitable channelization scheme. After selecting a communication channel for communicating in the WLAN 110, the channel selection controller 142 prompts the PHY processor 130 to transmit and/or receive packets via the selected communication channel. For example, in response to prompting by the MAC processor 126 (e.g. the channel selection controller 142), the PHY processor 130 tunes RF circuitry to the selected communication channel.

In some embodiments and/or scenarios, after the channel selection controller 142 selects a communication channel for communicating in the WLAN 110, the MAC processor 126 generates a frame that includes channel information indicative of the selected communication channel, and prompts the PHY processor 130 to transmit the frame in a packet to client stations to inform the client stations of the selected communication channel.

In an embodiment, the channel selection controller 142 is implemented by a processor executing machine readable instructions stored in a memory, where the machine readable instructions cause the processor to perform acts described in more detail below. In another embodiment, the channel selection controller 142 additionally or alternatively comprises one or more hardware state machines that are configured to perform acts described in more detail below.

The WLAN 110 includes a plurality of client stations 154. Although three client stations 154 are illustrated in FIG. 3, the WLAN 110 includes other suitable numbers (e.g., 1, 2, 4, 5, 6, etc.) of client stations 154 in various embodiments. The client station 154-1 includes a host processor 158 coupled to a wireless network interface device 162. The wireless network interface device 162 includes one or more MAC processors 166 (sometimes referred to herein as "the MAC processor 166" for brevity) and one or more PHY processors 170 (sometimes referred to herein as "the PHY processor 170" for brevity). The PHY processor 170 includes a plurality of transceivers 174, and the transceivers 174 are coupled to a plurality of antennas 178. Although three transceivers 174 and three antennas 178 are illustrated in FIG. 3, the client station 154-1 includes other suitable numbers (e.g., 1, 2, 4, 5, etc.) of transceivers 174 and antennas 178 in other embodiments. In some embodiments, the client station 154-1 includes a higher number of antennas 178 than transceivers 174, and antenna switching techniques are utilized.

In an embodiment, the wireless network interface device 162 is configured for operation within a single RF band at a given time. In another embodiment, the wireless network interface device 162 is configured for operation within two or more RF bands at the same time or at different times. For example, in an embodiment, the wireless network interface device 162 includes multiple PHY processors 170, where respective PHY processors 170 correspond to respective RF bands. In another embodiment, the wireless network interface device 162 includes a single PHY processor 170, where each transceiver 174 includes respective RF radios corresponding to respective RF bands. In an embodiment, the wireless network interface device 162 includes multiple MAC processors 166, where respective MAC processors 166 correspond to respective RF bands. In another embodiment, the wireless network interface device 162 includes a single MAC processor 166 corresponding to the multiple RF bands.

The wireless network interface device 162 is implemented using one or more ICs configured to operate as discussed below. For example, the MAC processor 166 may be implemented on at least a first IC, and the PHY processor 170 may be implemented on at least a second IC. The first IC and the second IC may be packaged together in a single IC package thereby forming a modular device, or the first IC and the second IC may be coupled together on a single printed board, for example, in various embodiments. As another example, at least a portion of the MAC processor 166 and at least a portion of the PHY processor 170 may be implemented on a single IC. For instance, the wireless network interface device 162 may be implemented using an SoC, where the SoC includes at least a portion of the MAC processor 166 and at least a portion of the PHY processor 170.

In an embodiment, the host processor 158 includes a processor configured to execute machine readable instructions stored in a memory device (not shown) such as a RAM, a ROM, a flash memory, etc. In an embodiment, the host processor 158 may be implemented, at least partially, on a first IC, and the network device 162 may be implemented, at least partially, on a second IC. As another example, the host processor 158 and at least a portion of the wireless network interface device 162 may be implemented on a single IC.

In various embodiments, the MAC processor 166 and the PHY processor 170 of the client station 154-1 are configured to generate data units, and process received data units, that conform to the WLAN communication protocol or another suitable communication protocol. For example, the MAC processor 166 may be configured to implement MAC layer functions, including MAC layer functions of the WLAN communication protocol, and the PHY processor 170 may be configured to implement PHY functions, including PHY functions of the WLAN communication protocol. The MAC processor 166 may be configured to generate MAC layer data units such as MSDUs, MPDUs, etc., and provide the MAC layer data units to the PHY processor 170. The PHY processor 170 may be configured to receive MAC layer data units from the MAC processor 166 and encapsulate the MAC layer data units to generate PHY data units such as PPDUs for transmission via the antennas 178. Similarly, the PHY processor 170 may be configured to receive PHY data units that were received via the antennas 178, and extract MAC layer data units encapsulated within the PHY data units. The PHY processor 170 may provide the extracted MAC layer data units to the MAC processor 166, which processes the MAC layer data units.

The PHY processor 170 is configured to downconvert one or more RF signals received via the one or more antennas 178 to one or more baseband analog signals, and convert the analog baseband signal(s) to one or more digital baseband signals, according to an embodiment. The PHY processor 170 is further configured to process the one or more digital baseband signals to demodulate the one or more digital baseband signals and to generate a PPDU. The PHY processor 170 includes amplifiers (e.g., an LNA, a power amplifier, etc.), an RF downconverter, an RF upconverter, a plurality of filters, one or more ADCs, one or more DACs, one or more DFT calculators (e.g., an FFT calculator), one or more IDFT calculators (e.g., an IFFT calculator), one or more modulators, one or more demodulators, etc.

The PHY processor 170 is configured to generate one or more RF signals that are provided to the one or more antennas 178. The PHY processor 170 is also configured to receive one or more RF signals from the one or more antennas 178.

The MAC processor 166 is configured to control the PHY processor 170 to generate one or more RF signals by, for example, providing one or more MAC layer data units (e.g., MPDUs) to the PHY processor 170, and optionally providing one or more control signals to the PHY processor 170, according to some embodiments. In an embodiment, the MAC processor 166 includes a processor configured to execute machine readable instructions stored in a memory device (not shown) such as a RAM, a ROM, a flash memory, etc. In an embodiment, the MAC processor 166 includes a hardware state machine.

In an embodiment, each of the client stations 154-2 and 154-3 has a structure that is the same as or similar to the client station 154-1. In an embodiment, one or more of the client stations 154-2 and 154-3 has a different suitable structure than the client station 154-1. Each of the client stations 154-2 and 154-3 has the same or a different number of transceivers and antennas. For example, the client station 154-2 and/or the client station 154-3 each have only two transceivers and two antennas (not shown), according to an embodiment.

Figure 4:
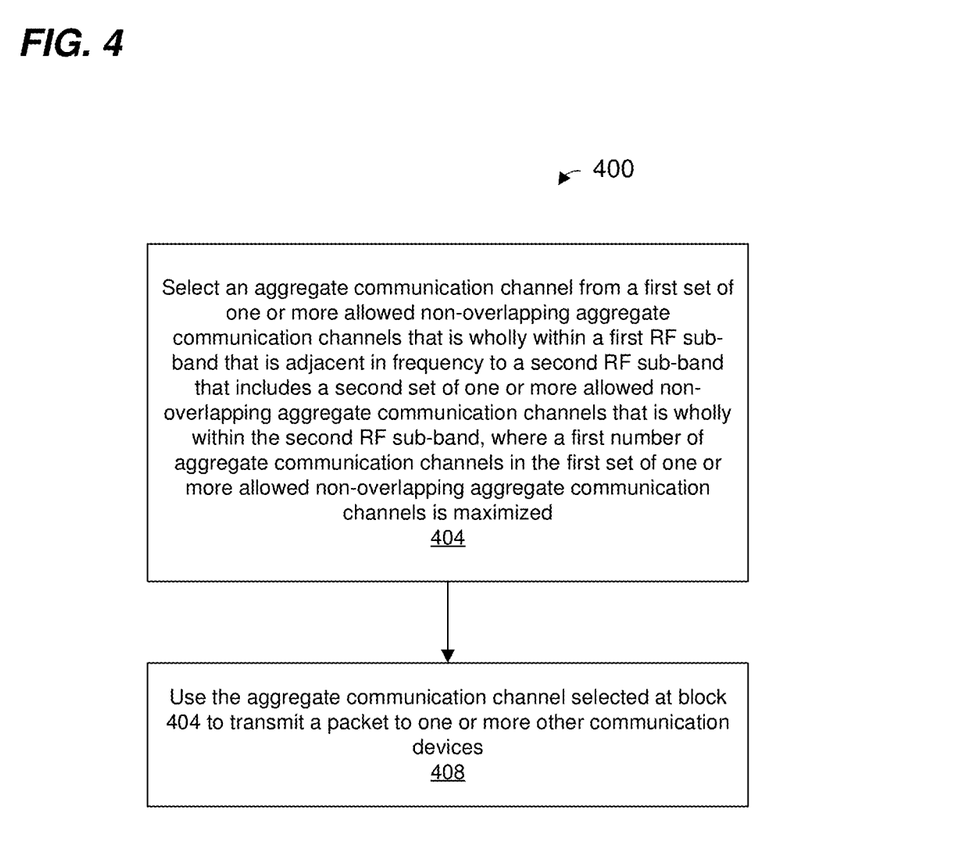
FIG. 4 is a flow diagram of an example method for selecting communication channels to use according to the example channelization scheme of FIG. 2, according to an embodiment.

FIG. 4 is a flow diagram of an example method 400 for communicating in a WLAN, according to an embodiment. In some embodiments, the AP 114 of FIG. 2 is configured to implement the method 400, and the method 400 is described in the context of the AP 114 for explanatory purposes. In other embodiments, however, the method 400 is implemented by another suitable device such as another suitable AP.

At block 404, the AP 114 selects (e.g., the wireless network interface device 122 selects, the MAC processor 126 selects, the channel selection controller selects, etc.) an aggregate communication channel from a first set of one or more allowed non-overlapping aggregate communication channels that is wholly within a first RF sub-band that is adjacent in frequency to a second RF sub-band that includes a second set of one or more allowed non-overlapping aggregate communication channels that is wholly within the second RF sub-band. In an embodiment, a first number of aggregate communication channels in the first set of one or more allowed non-overlapping aggregate communication channels is maximized. For example, the first set of one or more allowed non-overlapping aggregate communication channels is separated in frequency from the second set of allowed aggregate communication channels by a gap in frequency that is provided to align the first set of one or more allowed non-overlapping aggregate communication channels within the first RF sub-band so that the first number of aggregate communication channels wholly within the first RF sub-band is maximized. In another embodiment, a second number of aggregate communication channels in the second set of one or more allowed non-overlapping aggregate communication channels is also maximized. For example, the gap in frequency is provided also to align the second set of one or more allowed non-overlapping aggregate communication channels within the second RF sub-band so that the second number of aggregate communication channels wholly within the second RF sub-band is maximized. In an embodiment, the gap crosses a boundary between the first RF sub-band and the second RF sub-band.

In an embodiment, the gap in frequency corresponds to an allowable component communication channel that is partially within the first RF sub-band and partially within the second RF sub-band.

In an embodiment, the first set of one or more allowed non-overlapping aggregate communication channels is separated in frequency from the second set of allowed aggregate communication channels by a first gap in frequency as discussed above. In an embodiment, the first gap in frequency is smaller than a cumulative bandwidth of two non-overlapping component communication channels in the first RF sub-band.

In another embodiment, the first set of one or more allowed non-overlapping aggregate communication channels is also adjacent in frequency to a third RF sub-band that includes a third set of one or more allowed non-overlapping aggregate communication channels that is wholly within the third RF sub-band. In another embodiment, a third number of aggregate communication channels in the third set of one or more allowed non-overlapping aggregate communication channels is also maximized. For example, the first set of one or more allowed non-overlapping aggregate communication channels is separated in frequency from the third set of allowed aggregate communication channels by a second gap in frequency that is provided to align the first set of one or more allowed non-overlapping aggregate communication channels within the first RF sub-band so that the first number of aggregate communication channels wholly within the first RF sub-band is maximized and/or to align the third set of one or more allowed non-overlapping aggregate communication channels within the third RF sub-band so that the third number of aggregate communication channels wholly within the third RF sub-band is maximized.

In an embodiment, the second gap in frequency is smaller than the cumulative bandwidth of two non-overlapping component communication channels in the first RF sub-band. In an embodiment, the second gap in frequency corresponds to an allowable component communication channel that is partially within the first RF sub-band and partially within the third RF sub-band. In an embodiment, the second gap crosses a boundary between the first RF sub-band and the third RF sub-band.

In an embodiment, the first RF sub-band is U-NII-6 and the second RF sub-band is U-NII-5. In another embodiment, the first RF sub-band is U-NII-6 and the second RF sub-band is U-NII-7. In an embodiment, the first RF sub-band is U-NII-6, the second RF sub-band is U-NII-5, and the third RF sub-band is U-NII-7. In another embodiment, the first RF sub-band is U-NII-8 and the second RF sub-band is U-NII-7.

In an embodiment, each aggregate communication channel in the first set of one or more allowed non-overlapping aggregate communication channels comprises multiple adjacent non-overlapping component communication channels, and each aggregate communication channel in the second set of one or more allowed non-overlapping aggregate communication channels comprises multiple adjacent non-overlapping component communication channels.

In an embodiment, selecting the aggregate communication channel at block 404 comprises selecting the aggregate communication channel as a 40 MHz communication channel formed from two adjacent non-overlapping 20 MHz component communication channels, and each aggregate communication channel in the first set of one or more allowed non-overlapping aggregate communication channels is formed from respective two adjacent non-overlapping 20 MHz component communication channels. In an embodiment, each aggregate communication channel in the second set of one or more allowed non-overlapping aggregate communication channels is also formed from respective two adjacent non-overlapping 20 MHz component communication channels. In some embodiments, the 40 MHz communication channel is formed from 20 MHz component communication channels selected from a set of allowable, non-overlapping 20 MHz component communication channels that include 20 MHz component communication channels that are not wholly within the first RF sub-band (e.g., a 20 MHz component communication channels that falls partially in the first RF sub-band and partially within the second RF sub-band), but where each allowable 40 MHz communication channel is formed only with 20 MHz component communication channels that are wholly within the first RF sub-band.

In another embodiment, selecting the aggregate communication channel at block 404 comprises selecting the aggregate communication channel as an 80 MHz communication channel formed from four adjacent non-overlapping 20 MHz component communication channels, and each aggregate communication channel in the first set of one or more allowed non-overlapping aggregate communication channels is formed from respective four adjacent non-overlapping 20 MHz component communication channels. In an embodiment, each aggregate communication channel in the second set of one or more allowed non-overlapping aggregate communication channels is also formed from respective four adjacent non-overlapping 20 MHz component communication channels. In some embodiments, the 80 MHz communication channel is formed from 20 MHz component communication channels selected from a set of allowable, non-overlapping 20 MHz component communication channels that include 20 MHz component communication channels that are not wholly within the first RF sub-band (e.g., a 20 MHz component communication channels that falls partially in the first RF sub-band and partially within the second RF sub-band), but where each allowable 80 MHz communication channel is formed only with 20 MHz component communication channels that are wholly within the first RF sub-band.

In an embodiment, a first allowed maximum transmit power for the first RF sub-band is different than a second allowed maximum transmit power for the second RF sub-band.

In another embodiment, use of communication channels in the second RF sub-band requires consulting with an external database that indicates communication channels in the second RF sub-band that are available for unlicensed use, whereas use of communication channels in the first RF sub-band does not require consulting an external database to determine whether any communication channels in the first RF sub-band are not available for unlicensed use.

At block 408, the AP 114 uses (e.g., the wireless network interface device 122 uses, the PHY processor 130 uses, etc.) the aggregate communication channel selected at block 404 to transmit a packet to one or more client stations 154 in the WLAN 110.

Figure 5:
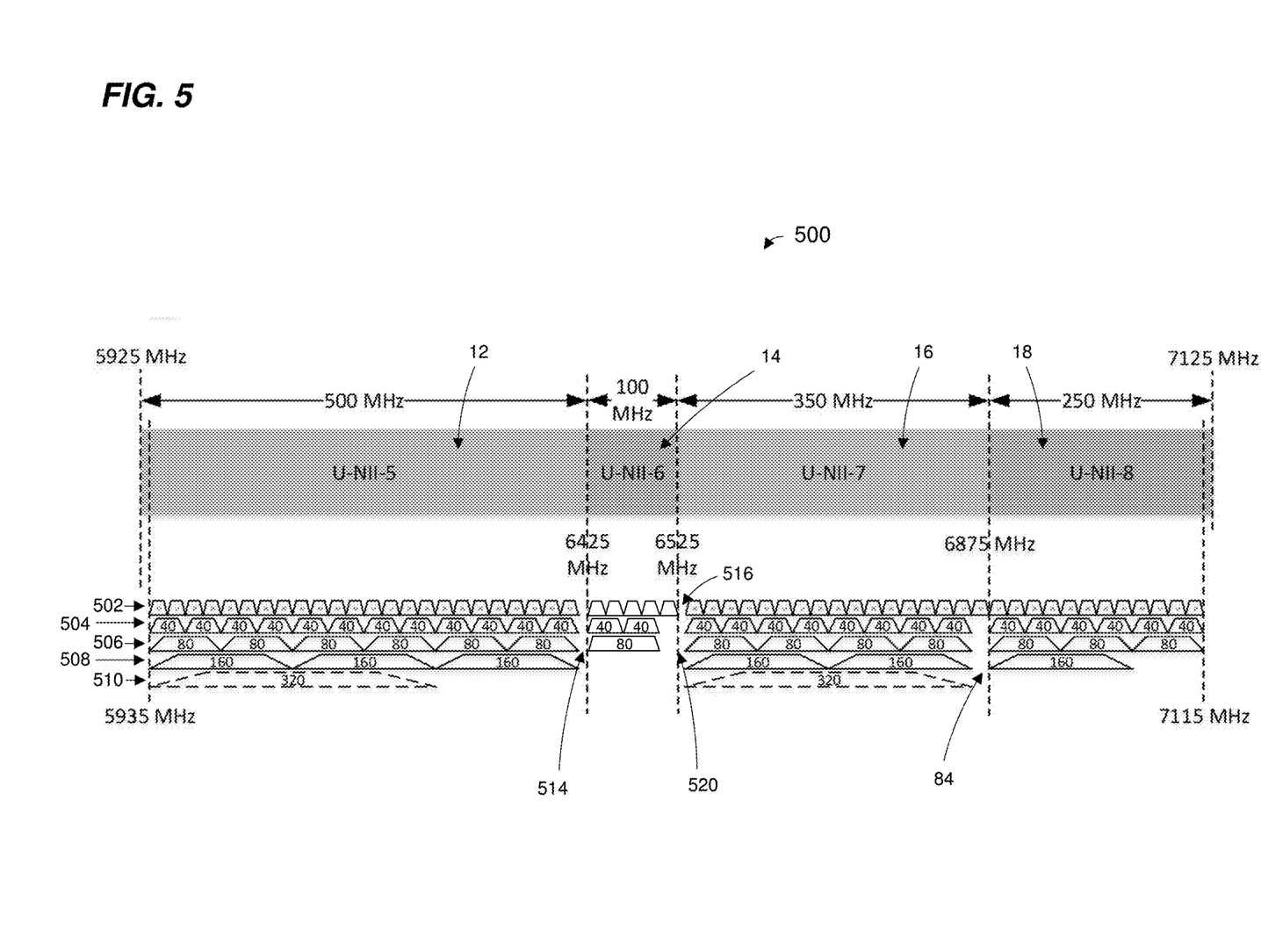
FIG. 5 is a diagram of another example WLAN channelization scheme in a 6 GHz RF band that maximizes a number of aggregate communication channels wholly within each of multiple RF sub-bands, according to another embodiment.

Although the WLAN communication devices of FIG. 3 and the method of FIG. 4 were described in the context of the example channelization scheme 60 of FIG. 2, other suitable channelization schemes are utilized in other embodiments. For example, FIG. 5 is a diagram of another example WLAN channelization scheme 500 according to which WLAN devices operate, in another embodiment. The example WLAN channelization scheme 500 is for the 6 GHz RF band, which is partitioned into the U-NII-5, U-NII-6, U-NII-7, and U-NII-8 sub-bands as discussed above.

The WLAN channelization scheme 500 includes a plurality of 20 MHz component communication channels 502, a plurality of 40 MHz aggregate communication channels 504, a plurality of 80 MHz aggregate communication channels 506, a plurality of 160 MHz aggregate communication channels 508, and a plurality of 320 MHz aggregate communication channels 510, according to an embodiment.

Unlike the example channelization scheme 60 of FIG. 2, the plurality of 20 MHz component communication channels 502 is not continuous. For example, there is a gap 514 in frequency between 20 MHz component communication channels in U-NII-5 and U-NII-6. Similarly, there is a gap 516 in frequency between 20 MHz component communication channels in U-NII-6 and U-NII-7.

U-NII-6 includes a maximum number (e.g., two) of non-overlapping 40 MHz aggregate channels wholly within U-NII-6, and a maximum number (e.g., one) of non-overlapping 80 MHz aggregate channels wholly within U-NII-6. Also, U-NII-6 includes a maximum number (e.g., five) of non-overlapping 20 MHz component channels wholly within U-NII-6.

In the embodiment illustrated in FIG. 5, the plurality of 40 MHz aggregate channels 504 is not continuous, as contrasted with the plurality of 40 MHz aggregate channels 24 in the channelization scheme 10 of FIG. 1. For example, 40 MHz aggregate channels in U-NII-6 are separated by the gap 514 in frequency from 40 MHz aggregate channels in U-NII-5. Similarly, 40 MHz aggregate channels in U-NII-6 are separated by a gap 520 in frequency from 40 MHz aggregate channels in U-NII-7. Similarly, 40 MHz aggregate channels in U-NII-8 are separated by the gap 84 in frequency from 40 MHz aggregate channels in U-NII-7.

In the embodiment illustrated in FIG. 5, the plurality of 80 MHz aggregate channels 508 is also not continuous, as contrasted with the plurality of 80 MHz aggregate channels 26 in the channelization scheme 10 of FIG. 1. For example, an 80 MHz aggregate channel in U-NII-6 is separated by the gap 514 in frequency from 80 MHz aggregate channels in U-NII-5. Similarly, the 80 MHz aggregate channel in U-NII-6 is separated by the gap 520 in frequency from 80 MHz aggregate channels in U-NII-7. Similarly, 80 MHz aggregate channels in U-NII-8 are separated by the gap 84 in frequency from 80 MHz aggregate channels in U-NII-7.

In the embodiment illustrated in FIG. 5, none of the 20 MHz component channels crosses a boundary between the U-NII-5, U-NII-6, U-NII-7, and U-NII-8 sub-bands. Similarly, none of the 40 MHz aggregate channels crosses a boundary between the U-NII-5, U-NII-6, U-NII-7, and U-NII-8 sub-bands. Similarly, none of the 80 MHz aggregate channels crosses a boundary between the U-NII-5, U-NII-6, U-NII-7, and U-NII-8 sub-bands. Similarly, none of the 160 MHz and 320 MHz aggregate channels crosses a boundary between the U-NII-5, U-NII-6, U-NII-7, and U-NII-8 sub-bands.

In the embodiment illustrated in FIG. 5, U-NII-5 includes a maximum number (e.g., twelve) of non-overlapping 40 MHz aggregate channels wholly within U-NII-5, and a maximum number (e.g., six) of non-overlapping 80 MHz aggregate channels wholly within U-NII-5. Similarly, U-NII-7 includes a maximum number (e.g., eight) of non-overlapping 40 MHz aggregate channels wholly within U-NII-7, a maximum number (e.g., four) of non-overlapping 80 MHz aggregate channels wholly within U-NII-7, a maximum number (e.g., two) of non-overlapping 160 MHz aggregate channels wholly within U-NII-7, and a maximum number (e.g., one) of non-overlapping 320 MHz aggregate channels wholly within U-NII-7.

Although the WLAN communication devices of FIG. 3 and the method of FIG. 4 were described in the context of the boundaries and bandwidths of U-NII-5, U-NII-6, U-NII-7, and U-NII-8, as illustrated in FIGS. 2 and 5, in other embodiments, the WLAN communication devices of FIG. 3 and the method of FIG. 4 are used in conjunction with other suitable RF sub-bands having other suitable boundaries and/or other suitable bandwidths.

Additionally, although the WLAN communication devices of FIG. 3 and the method of FIG. 4 were described in the context of the some RF sub-bands that require consulting with an external database that indicates available communication channels, whereas other RF sub-bands do not require consulting with the external database to determine available communication channels, in other embodiments, the WLAN communication devices of FIG. 3 and the method of FIG. 4 are used in conjunction with RF sub-bands having other suitable different use restrictions such as one or more of i) different allowable maximum transmit powers, ii) some RF sub-bands being limited to indoor use and other RF sub-bands permitting outdoor use, iii) some RF sub-bands permitting certain transmission modes (e.g., an extended range mode) and other RF sub-bands not permitting the certain transmission modes, etc.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A method for communicating in a wireless local area network (WLAN), the method comprising:
   selecting, at a first communication device, an aggregate communication channel from a first set of one or more allowed non-overlapping aggregate communication channels that is wholly within a first radio frequency (RF) sub-band that does not require consulting an external database to determine whether any first communication channels in the first RF sub-band are not available for unlicensed use, wherein the first RE sub-band is adjacent in frequency to a second RF sub-band that requires consulting with the external database to determine second communication channels in the second RF sub-band that are available for unlicensed use, wherein the second RF sub-band includes a second set of one or more allowed non-overlapping aggregate communication channels that is wholly within the second RF sub-band and that is separated in frequency from the first set of allowed aggregate communication channels by a gap in frequency, and wherein the gap in frequency is smaller than a cumulative bandwidth of two component communication channels in the first RF sub-band; and
   using, at the first communication device, the selected aggregate communication channel to transmit a packet to one or more second communication devices in the WLAN.

2. The method of claim 1, wherein selecting the aggregate communication channel comprises selecting the aggregate communication channel from the first set of one or more allowed non-overlapping aggregate communication channels that is adjacent in frequency to a third RF sub-band that includes a third set of one or more allowed non-overlapping aggregate communication channels that is wholly within the third RF sub-band.

3. The method of claim 2, wherein selecting the aggregate communication channel comprises selecting the aggregate communication channel from the first set of one or more allowed non-overlapping aggregate communication channels that is i) separated from the second set of non-overlapping aggregate communication channels by a first gap in frequency, and ii) separated from the third set of non-overlapping aggregate communication channels by a second gap in frequency.

4. The method of claim 3, wherein the second gap in frequency is smaller than the cumulative bandwidth of two non-overlapping component communication channels in the first RF sub-band.

5. The method of claim 1, wherein selecting the aggregate communication channel comprises selecting the aggregate communication channel as an aggregate communication channel formed from multiple adjacent non-overlapping component communication channels, wherein each aggregate communication channel in the first set of one or more allowed non-overlapping aggregate communication channels is formed from multiple adjacent non-overlapping component communication channels, and wherein each aggregate communication channel in the second set of one or more allowed non-overlapping aggregate communication channels is formed from multiple adjacent non-overlapping component communication channels.

6. The method of claim 5, wherein selecting the aggregate communication channel comprises selecting the aggregate communication channel as a 40 MHz communication channel formed from two adjacent non-overlapping 20 MHz component communication channels, wherein each aggregate communication channel in the first set of one or more allowed non-overlapping aggregate communication channels is formed from respective two adjacent non-overlapping 20 MHz component communication channels, and wherein each aggregate communication channel in the second set of one or more allowed non-overlapping aggregate communication channels is formed from respective two adjacent non-overlapping 20 MHz component communication channels.

7. The method of claim 5, wherein selecting the aggregate communication channel comprises selecting the aggregate communication channel as an 80 MHz communication channel formed from four adjacent non-overlapping 20 MHz component communication channels, wherein each aggregate communication channel in the first set of one or more allowed non-overlapping aggregate communication channels is formed from respective four adjacent non-overlapping 20 MHz component communication channels, and wherein each aggregate communication channel in the second set of one or more allowed non-overlapping aggregate communication channels is formed from respective four adjacent non-overlapping 20 MHz component communication channels.

8. The method of claim 1, wherein selecting the aggregate communication channel comprises selecting the aggregate communication channel from the first set of one or more allowed non-overlapping aggregate communication channels that includes a maximum number of non-overlapping aggregate communication channels wholly within the first RF sub-band.

9. The method of claim 1, wherein a first allowed maximum transmit power for the first RF sub-band is different than a second allowed maximum transmit power for the second RF sub-band.

10. A wireless communication device for communicating in a wireless local area network (WLAN), the wireless communication device comprising:
a wireless network interface device having one or more integrated circuit (IC) devices, wherein the one or more IC devices are configured to:
select an aggregate communication channel from a first set of one or more allowed non-overlapping aggregate communication channels that is wholly within a first radio frequency (RF) sub-band that does not require consulting an external database to determine whether any first communication channels in the first RF sub-band are not available for unlicensed use, wherein the first RE sub-band is adjacent in frequency to a second RF sub-band that requires consulting with the external database to determine second communication channels in the second RF sub-band that are available for unlicensed use, wherein the second RF sub-band includes a second set of one or more allowed non-overlapping aggregate communication channels that is wholly within the second RF sub-band and that is separated in frequency from the first set of allowed aggregate communication channels by a gap in frequency, and wherein the gap in frequency is smaller than a cumulative bandwidth of two component communication channels in the first RF sub-band, and
use the selected aggregate communication channel to transmit a packet to one or more second communication devices in the WLAN.

11. The wireless communication device of claim 10, wherein the one or more IC devices are further configured to:
select the aggregate communication channel from the first set of one or more allowed non-overlapping aggregate communication channels that is adjacent in frequency to a third RF sub-band that includes a third set of one or more allowed non-overlapping aggregate communication channels that is wholly within the third RF sub-band.

12. The wireless communication device of claim 11, wherein the one or more IC devices are further configured to:
select the aggregate communication channel from the first set of one or more allowed non-overlapping aggregate communication channels that is i) separated from the second set of non-overlapping aggregate communication channels by a first gap in frequency, and ii) separated from the third set of non-overlapping aggregate communication channels by a second gap in frequency.

13. The wireless communication device of claim 12, wherein the second gap in frequency is smaller than the cumulative bandwidth of two non-overlapping component communication channels in the first RF sub-band.

14. The wireless communication device of claim 10, wherein the one or more IC devices are further configured to:
select the aggregate communication channel as an aggregate communication channel formed from multiple adjacent non-overlapping component communication channels, wherein each aggregate communication channel in the first set of one or more allowed non-overlapping aggregate communication channels is formed from multiple adjacent non-overlapping component communication channels, and wherein each aggregate communication channel in the second set of one or more allowed non-overlapping aggregate communication channels is formed from multiple adjacent non-overlapping component communication channels.

15. The wireless communication device of claim 14, wherein the one or more IC devices are further configured to:
select the aggregate communication channel as a 40 MHz communication channel formed from two adjacent non-overlapping 20 MHz component communication channels, wherein each aggregate communication channel in the first set of one or more allowed non-overlapping aggregate communication channels is formed from respective two adjacent non-overlapping 20 MHz component communication channels, and wherein each aggregate communication channel in the second set of one or more allowed non-overlapping aggregate communication channels is formed from respective two adjacent non-overlapping 20 MHz component communication channels.

16. The wireless communication device of claim 14, wherein the one or more IC devices are further configured to:

select the aggregate communication channel as an 80 MHz communication channel formed from four adjacent non-overlapping 20 MHz component communication channels, wherein each aggregate communication channel in the first set of one or more allowed non-overlapping aggregate communication channels is formed from respective four adjacent non-overlapping 20 MHz component communication channels, and wherein each aggregate communication channel in the second set of one or more allowed non-overlapping aggregate communication channels is formed from respective four adjacent non-overlapping 20 MHz component communication channels.

17. The wireless communication device of claim 10, wherein the one or more IC devices are further configured to:

select the aggregate communication channel from the first set of one or more allowed non-overlapping aggregate communication channels that includes a maximum number of non-overlapping aggregate communication channels wholly within the first RF sub-band.

18. The wireless communication device of claim 10, wherein a first allowed maximum transmit power for the first RF sub-band is different than a second allowed maximum transmit power for the second RF sub-band.

19. The method of claim 1, wherein the selected aggregate communication channel is a first selected aggregate communication channel, and the packet is a first packet, and wherein the method further comprises:

consulting, by the first communication device, the external database to determine a set of one or more second communication channels within the second RF sub-band that are available for unlicensed use;

selecting, at the first communication device, a second aggregate communication channel from the second set of one or more allowed non-overlapping aggregate communication channels based on the set of one or more second communication channels within the second RF sub-band that are available for unlicensed use; and     using, at the first communication device, the selected second aggregate communication channel to transmit a second packet to one or more second communication devices in the WLAN.

20. The wireless communication device of claim 10, wherein the selected aggregate communication channel is a first selected aggregate communication channel, and the packet is a first packet, and wherein the one or more IC devices are further configured to:

consult the external database to determine a set of one or more second communication channels within the second RF sub-band that are available for unlicensed use;

select a second aggregate communication channel from the second set of one or more allowed non-overlapping aggregate communication channels based on the set of one or more second communication channels within the second RF sub-band that are available for unlicensed use; and     use the selected second aggregate communication channel to transmit a second packet to one or more second communication devices in the WLAN.

\* \* \* \* \*